(12) United States Patent
Lewis et al.

(10) Patent No.: US 7,783,440 B1
(45) Date of Patent: Aug. 24, 2010

(54) OBTAINING AN OPTICAL TRANSFER FUNCTION (OTF) FROM AN EDGE IN A SAMPLED IMAGE DATA SET

(75) Inventors: Cynthia Lynne Lewis, Webster, NY (US); Andrew P. Sacco, Pittsford, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 501 days.

(21) Appl. No.: 11/880,736

(22) Filed: Jul. 24, 2007

(51) Int. Cl.
*G06F 19/00* (2006.01)
(52) U.S. Cl. .................................... 702/77
(58) Field of Classification Search .............. 702/76, 702/77, 182–185, 188
See application file for complete search history.

(56) References Cited

U.S. PATENT DOCUMENTS 4,402,602 A  9/1983  Kuppenheimer, Jr.
7,499,600 B2 * 3/2009 Ojanen et al. ............... 382/275

OTHER PUBLICATIONS

Berge Tatian; "Method for Obtaining the Transfer Function from the Edge Response Function", Journal of the Optical Society of America; vol. 55, No. 8, Aug. 1965; pp. 1014-1019.

* cited by examiner

*Primary Examiner*—Edward Raymond
(74) *Attorney, Agent, or Firm*—RatnerPrestia

(57) ABSTRACT

A method for obtaining a modulation transfer function (MTF) of a knife-edge target imaged by an electro-optical device is described. The method includes the steps of: (a) obtaining edge response data points, where a data point includes a perpendicular distance, d, to the knife-edge target; and (b) constructing a sequence of line slopes of the edge response data points, where a line slope includes a spread of edge response data points. The method then selects a line slope that minimizes the spread of edge response data points, and calculates the MTF, based on the edge response data points included in the selected line slope. The MTF is provided to a user. An edge response data point is defined by a pair of values of (d, E) of a pixel, where distance, d, is the shortest distance between the pixel and a line slope and the pixel has an intensity value, E.

18 Claims, 8 Drawing Sheets

OBTAINING AN OPTICAL TRANSFER FUNCTION (OTF) FROM AN EDGE IN A SAMPLED IMAGE DATA SET

STATEMENT REGARDING FEDERALLY SPONSORED RESEARCH

This invention was made with Government support. The Government has certain rights in the invention.

TECHNICAL FIELD

The present invention relates, in general, to a system and method for obtaining an OTF of an electro-optical system. More specifically, the present invention relates to a system and method for measuring an OTF of an electro-optical system using a knife-edge target, calculating edge response data of the target, and determining a modulation transfer function (MTF) directly from the edge response data.

BACKGROUND OF THE INVENTION

An electro-optical system converts radiant energy of a particular wavelength or range of wavelengths into an electrical signal that may be used to construct an array of integer values that represents an image. The system usually includes an optical component that focuses radiant energy onto a sensor element. The formed image on the sensing element is converted into a measurable electrical signal. One example of an electro-optical system is a consumer grade digital camera. Another example of an electro-optical system, operating outside the visible range, is the AXAF orbiting observatory which focuses radiant energy from distant galaxies in the x-ray band onto a sensor array. Both of these systems include two basic elements of an electro-optical imaging system, namely, an electronic sensing element and a component for forming an image.

The capability of a electro-optical system to resolve fine details of an object is referred to as its resolving power or resolution, while sharpness and/or acutance is often used to describe spatial image quality. The contrast in the spatial modulation of an image falls to nearly zero, as the spatial frequency increases towards the optical cutoff frequency. This may be seen as the capability of the electro-optical system to resolve details of line pairs that are spatially separated by different, ever smaller, spatial distances. The modulus of the optical transfer function (OTF), referred to as the modulation transfer function (MTF), is a metric used to evaluate the resolution or contrast of an electro-optical system, as it approaches its resolution limit.

Methods for mathematically describing a transfer function for optical systems were developed in the 1930's and 1940's as an alternative to geometric ray tracing methods, in order to better describe the wave nature of optical systems and account for the many possible aberrations present in optical systems. Empirical methods, such as trial and error, were often used because of the complexity in making these types of measurements. In the 1950's and 1960's, methods with reduced complexity were developed and the MTF as a metric for image resolving power became more prevalent.

In the 1960's, a method using a single sharp contrast edge was developed, commonly known as the knife-edge method. The knife-edge method produced a continuous MTF curve from a single edge transition in an image, whereas other methods such as harmonic analysis and contrast analysis produced performance results at only discrete spatial frequencies on the MTF curve. The knife-edge method is still the preferred method for determining the characteristic spatial performance of an optical system.

The MTF is a useful qualitative measure of the resolution of an electro-optical system and the ability of a system to produce a sharp image at specific spatial frequencies. Unfortunately, the quantitative accuracy of the MTF is generally accepted to be quite poor, with an uncertainty of 5% or more at the sensor sampling Nyquist spatial frequency, with increasing uncertainty as the spatial frequency approaches the sampling cutoff frequency of the sensor sampling function. Many of the simplifications, applied in the 1960's and still used today, ignore key features of the transfer function, in order to avoid complexity. These key features are deemed unnecessary for an inexpensive assessment of spatial performance. Furthermore, additional error tends to be introduced and the true signal tends to be lost with this process of computing MTF. Conventional techniques apply some arbitrary smoothing of the image data in an attempt to remove noise. As a result, meaningful information may be lost and apparent information, not actually present, may be introduced.

One example of using a special image performance metric is to specify resolution as a requirement for a sensor system in terms of an expected MTF value at the sampling Nyquist frequency. This is particularly important for the remote sensing industry, where customers have requirements at specific spatial frequencies. These requirements must be communicated in a consistent manner to potential suppliers, and suppliers must have a way to demonstrate the resolution capabilities of their components. The MTF is also a useful tool in comparing various imaging systems to determine the system best suited for a particular task. In these cases, it is common to specify MTF at multiple spatial frequencies, for example, five to ten spatial frequencies that are fractions of the Nyquist spatial frequency of a sensor system.

There are two conventional methods for calculating MTF using knife-edge targets. Both methods derive the edge response data from the knife-edge target data. Once the edge response data is available, both of the conventional methods for calculating a knife-edge MTF involve smoothing the edge response data through a statistical smoothing curve fit, or a piecewise fit. Then data points are sampled from the fit, at smaller spatial intervals than available in the original edge data set.

One conventional MTF calculation method from an edge response is shown in FIG. 1. The method, designated as 10, uses a derivative and a Fast Fourier Transform (FFT). The image 11 of an edge from a knife-edge type target is used to estimate edge slope and location of the edge slope by obtaining multiple data pairs (d, E) as edge response data, as shown in step 12. Next, step 13 constructs a numerical derivative of the edge response. The numerical derivative is used as an estimate of the underlying line spread function. Step 14 smooths the numerical derivative of the edge response (d, E) to obtain a curve of f(d). Step 15 subdivides the d axis into a large number of equally spaced points along the axis. Step 16 applies an FFT to the numerical derivative estimate of the line spread function to obtain the MTF at spatial frequencies determined by the sample size and spacing. The smoothing performed on the original edge response data, however, introduces error and spurious signal content into the data. The error and the signal content is further exaggerated through the numerical differentiation process.

This conventional MTF calculation method does not provide MTF for many spatial frequencies of interest, because of the limited data sample size and spacing. The MTF at the desired spatial frequencies must be obtained through interpolation between available points. This adds another source of error beyond those already described, because the available spatial frequencies may not be particularly close together, and the other sources of error from smoothing and numerical differentiation may actually distort the shape of the MTF curve.

The second conventional method for estimating MTF also works directly with the larger resampled edge data set, using an algorithm related to the 1965 work of Berge Tatian (Tatian's method). The method, designated as 20 in FIG. 2, uses an image 11 of an edge from a knife-edge type target to estimate edge slope and location of the edge slope by obtaining multiple data pairs (d, E) as edge response data, as shown in step 12. Step 21 puts a continuous curve through the data pairs (d, E). Step 22 subdivides the d axis into a large number of equally spaced points along the axis. The edge response data is centered, smoothed in some fashion, and resampled at equally spaced intervals. In order to have the edge response data centered at a pivot point for the edge, it is frequently necessary to either throw away data from one of the ends of the edge, or to add fictitious data to achieve equal numbers of data points about this pivot point. This adjustment is performed by step 23. Tatian's method is then applied in step 24.

The preparation of the data for method 20 is as prone to error as the previously described method 10. Specifically, the phase information from the OTF is lost, and only a phase shifted estimate of the MTF with unknown phase shift remains. These methods of preparing the edge response data by smoothing and resampling, followed by tweaking of the data, and the method of obtaining a pivot point for application of Tatian's method create large errors that cannot be estimated at spatial frequencies as small as 50% of the Nyquist frequency. Even worse, the data manipulation creates a process that is not generally reproducible.

A hallmark of both conventional methods is that the results are difficult to reproduce and have poor accuracy. Another major drawback of these methods is sensitivity to the phase of the target and subsequent failure to capture the phase information available in the OTF. If multiple measurements are made with the target displaced by a fraction of a sampling interval, or by a non-integral number of sampling intervals, the data generally yield different results. This further complicates obtaining good MTF estimates and adds to the difficulty in obtaining repeatable results.

Generally, an MTF curve is accepted as a metric of spatial resolving performance having value up to the Nyquist frequency, where the error is expected to be as much as 5%. Beyond the Nyquist frequency, the error is generally accepted to be greater than 5%. Furthermore, the MTF as a metric describes the qualitative resolving power of the system and phase information is ignored. Without the phase information, the uncertainty beyond the Nyquist frequency quickly becomes unacceptable. It is this uncertainty which makes cascading MTF curves problematic either in an attempt to isolate individual MTF components, or in combining components to form a complete system model. Due to the drawbacks and limitations associated with conventional test and calculation methods, MTF is used with the understanding that the error is large and perhaps unacceptable beyond the Nyquist frequency.

The present invention addresses the above deficiencies by providing a system and method of determining edge slope and location of a knife-edge image. The present invention also provides a method for determining an OTF that preserves phase information and provides good estimates of the MTF measurement error at any spatial frequency up to the optical cutoff of the system. As will be explained, the present invention measures OTF and obtains the MTF of an electro-optic system with improved accuracy and with repeatable results.

SUMMARY OF THE INVENTION

To meet this and other needs, and in view of its purposes, the present invention provides a method for obtaining a modulation transfer function (MTF) of an electro-optical system using the image of a knife-edge target. The method includes the steps of: (a) obtaining edge response data points, wherein a data point includes a perpendicular distance, d, to the image of the knife-edge target; (b) constructing a sequence of line slopes of the edge response data points, wherein a line slope includes a spread of edge response data points; (c) selecting a line slope that minimizes the spread of edge response data points; (d) calculating the MTF, based on the edge response data points included in the line slope selected in step (c); and (e) providing the MTF to a user. Step (a) includes obtaining the edge response data points, wherein the data point includes an integer intensity value, E, of a pixel corresponding to the data point. The data point is defined by a pair of values of (d, E) of the pixel, and the distance d is a shortest distance between the pixel and the line slope defined as the location of the image of the knife-edge represented by a discrete line. Step (c) includes using least squares regression to minimize the spread of the edge response data points.

Prior to calculating the MTF, the method may shift the selected line slope by adding a constant value to each distance d in the pair of values, so that the edge response data points are approximately centered about d=0. The method may also select an imaginary portion of the OTF defined as Im(x), where x is a spatial value between 0 and a cutoff spatial frequency, cf. The method may then minimize the imaginary portion of the OTF by minimizing an absolute value of Im(cf), as the value of x is shifted when adding the constant value to the value of x.

Another embodiment of the present invention includes a system for providing to a user an MTF of an electro-optical device. The system includes an edge determination module for receiving edge response data of a knife-edge target imaged by the electro-optical device, and calculating a sequence of line slopes of the knife-edge target, each line slope including a spread of edge response data points about the respective line slope. A selector module selects a line slope having a minimum spread of the edge response data points, and an MTF calculator determines MTF based on the selected line slope. The system includes a storage device, coupled to the edge determination module, for storing the edge response data. The storage device includes an array of integers representing the edge response data as pairs of values of (d, E), where d is a minimum distance between a respective pixel and a respective line slope, and E is an intensity value of the respective pixel.

The system may include a shifting module, coupled to the selector module, for shifting the selected line slope by adding a constant value to each distance, d, in the pair of values (d, E), so that the edge response data points are approximately centered about d=0. The selector module may include a least squares regression algorithm for minimizing the spread of the edge response data points.

Another embodiment of the present invention includes a system for providing to a user an optical transfer function (OTF) of an electro-optical device. The system includes an edge determination module for receiving edge response data of a knife-edge target, imaged by the electro-optical device, and calculating a sequence of line slopes of the knife-edge target, each line slope including a spread of edge response data points about the respective line slope. A selector module selects a line slope having a minimum spread of the edge response data points, and an OTF calculator determines OTF based on the selected line slope. The edge response data points includes an array having pairs of values of (d, E), where d is a minimum distance between a respective pixel and a respective line slope, and E is an intensity value of the respective pixel. A shifting module, coupled to the selector module, may shift the selected line slope by adding a constant value to each distance, d, in the pair of values (d, E), so that the edge response data points are approximately centered about d=0. The OTF calculator includes an imaginary function, Im(x), where x is a spatial value between 0 and a cutoff spatial frequency, cf, and the OTF calculator is configured to minimize either (a) the absolute value of Im(cf) or the integral of the norm of Im(x), where x is between 0 and cf.

It is understood that the foregoing general description and the following detailed description are exemplary, but are not restrictive, of the invention.

BRIEF DESCRIPTION OF THE FIGURES

The invention is best understood from the following detailed description when read in connection with the accompanying figures.

DETAILED DESCRIPTION OF THE INVENTION

As will be explained, the present invention estimates an optical transfer function (OTF) of an electro-optical system in a multi-step method using novel algorithms and a knife-edge target. The knife-edge target image is tilted with respect to a focal plane array of the sensor, such that the target includes edges which cross different detector elements at different phases. The target is imaged onto the sensor, and the edge slope and edge response data are derived. The modulation transfer function (MTF) is then estimated directly from this edge response data. Finally, the optical transfer function (OTF) is calculated by finding the correct spatial position of the edge and hence the correct phase component. Error bounds for the MTF are also estimated by the present invention.

Figure 1:
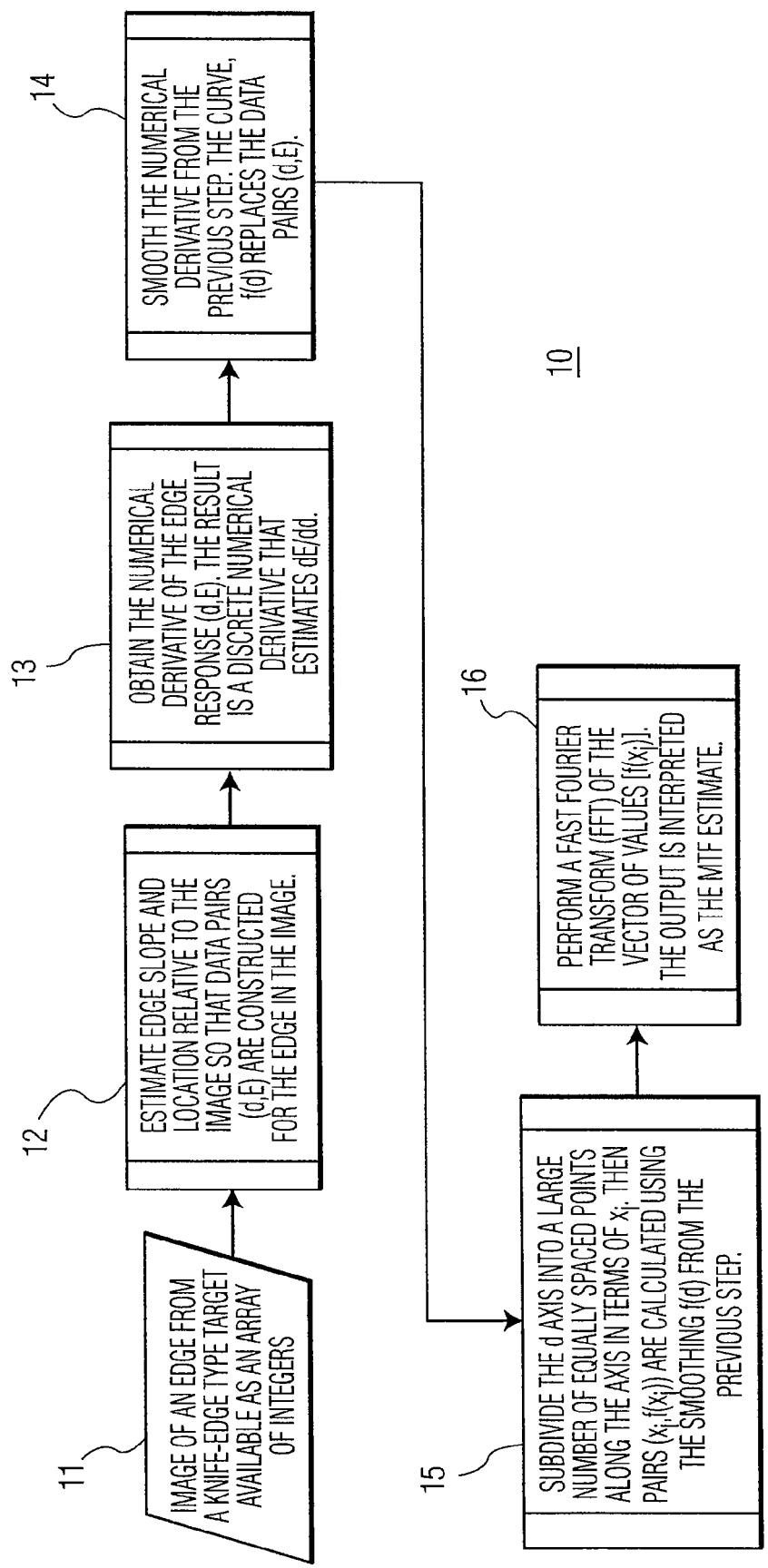
FIG. 1 is a functional flow diagram of a conventional method for calculating MTF of an optical device having an edge response of an image, using derivative and fast Fourier transform (FFT) algorithms.
Figure 2:
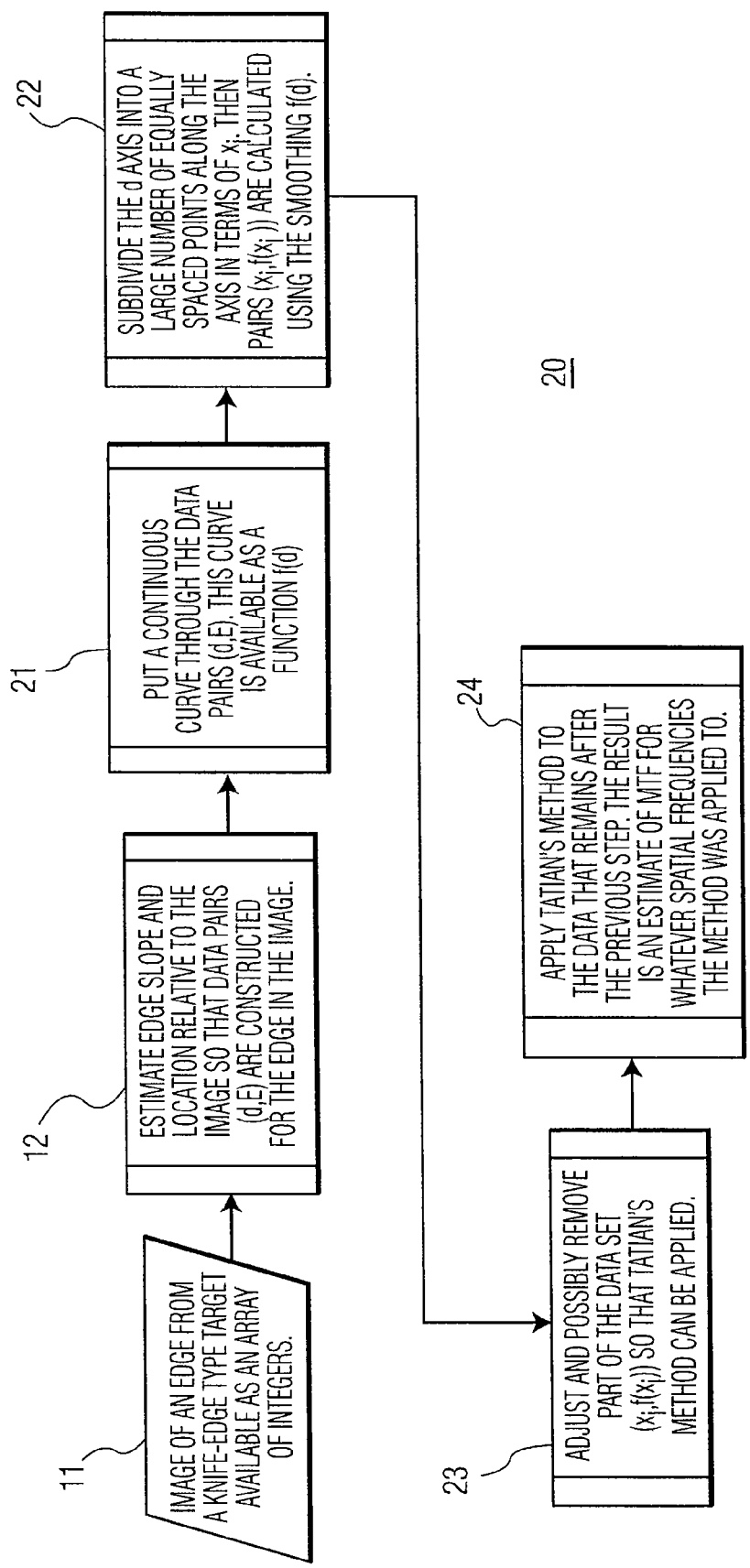
FIG. 2 is a function flow diagram of another conventional method for estimating MTF of an optical device having an edge response of an image, using Tatian's algorithm.
Figure 3A:
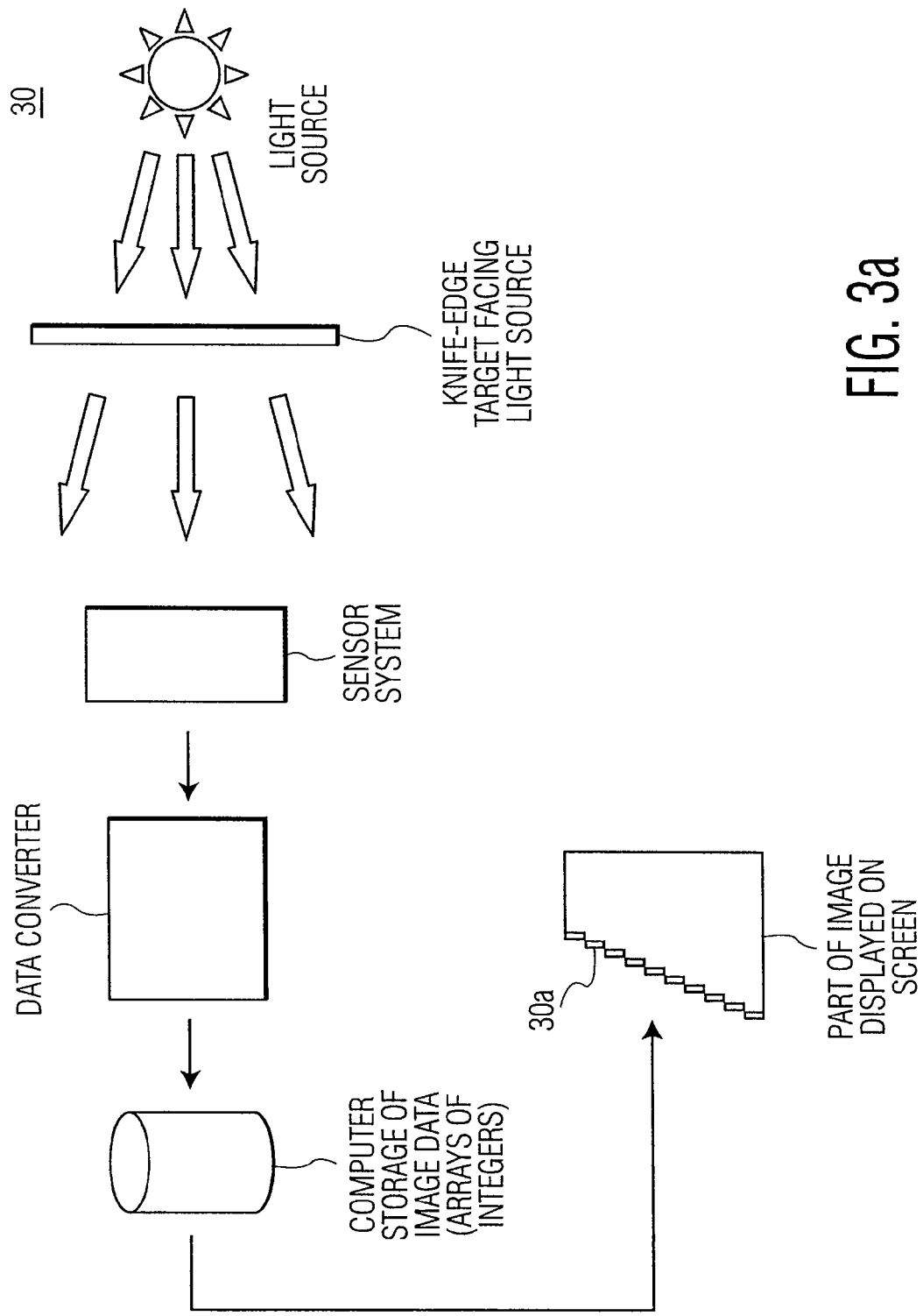
FIG. 3a is a functional block diagram of a system for obtaining knife-edge data of a knife-edge target, imaged by an image forming device onto a sensor, in accordance with an embodiment of the present invention.
Figure 3B:
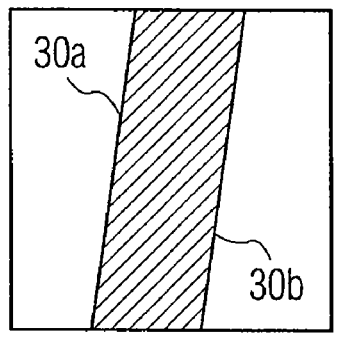
FIG. 3b is an image of a knife-edge target that is tilted with respect to a focal plane array (FPA) of the sensor, in accordance with an embodiment of the present invention.

Referring to FIG. 3a, there is shown a system for obtaining knife-edge data, the system generally designated as 30. As shown, a knife-edge target is imaged by a sensor system, which may include any sensor that captures an image. As shown in FIG. 3b, the knife-edge target image is tilted with respect to a focal plane array of the sensor, such that the target includes edges 30a and 30b. The output of the sensor system is provided to a data converter module. The data converter module may be any module that converts captured sensor data, which are typically analog data, into digital data. The data converter module may also convert the sensor data into an array of integers, which represent the sensed knife-edge target. The converted image data may be stored in a computer storage device as an array of integers, as will be explained later.

A portion of the knife-edge target, for example edge 30a, is shown imaged on a display for viewing by a user. The same target image is shown in more detail in FIG. 4 with a portion of an edge designated as 40. As shown, a line y=mx+b represents the edge response of the image of the knife-edge target. The angle θ represents the angle of the line with the vertical line. It will be appreciated that the slope m is equal to −1/tan θ, where θ is the angle shown in FIG. 4.

The edge described by the line y=mx+b may be defined as follows: y is the row position of the image of the edge and x is the column position of the image of the edge in pixels, relative to some arbitrary origin. The origin is arbitrary and advantageously needs not to be determined. Instead, the present invention determines the slope, m, of the edge precisely, and the translational location, b, is determined separately.

Pixels are identified by their center points relative to the same arbitrary origin as the edge. Some choice for b is made by the present invention and, for specificity, the choice of b=0 may be made. Any other value for b may also be specified. The lower left corner of the image array is set to be (0, 0), so the center of the pixel in the bottom row, at the left most column (first column) is (0.5, 0.5).

Figure 4:
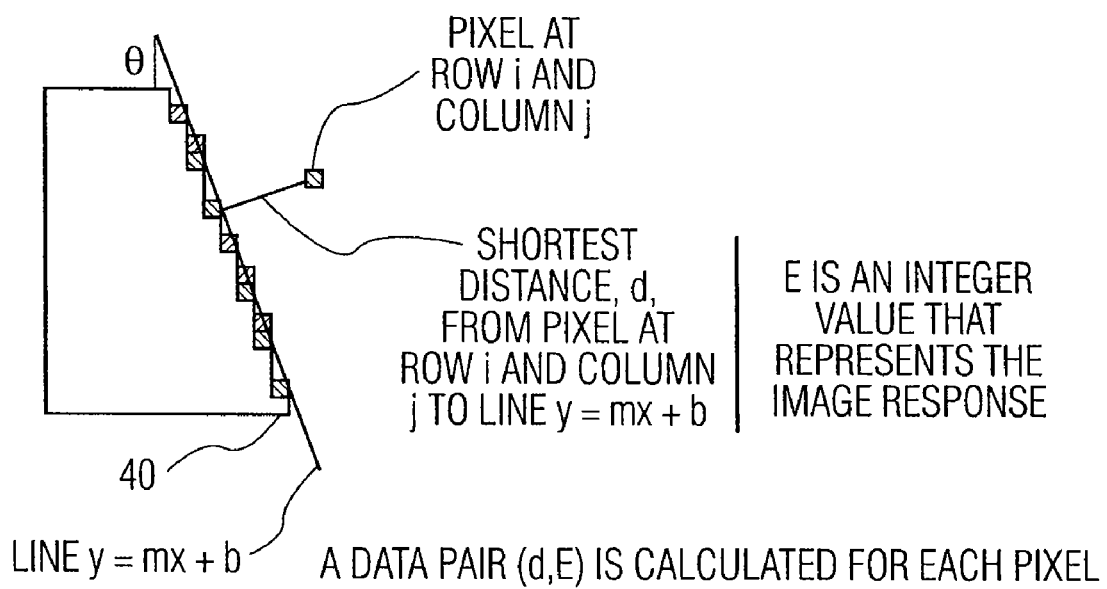
FIG. 4 is a magnified detail of an edge of a portion of a knife-edge target with a line slope approximating the edge.

The distance from an image pixel to the edge y=mx+b is configured to be the shortest distance from the center of the pixel to the line y=mx+b, as shown in FIG. 4. Other edge slope determinations by the present invention are inconsistent in the definition of distance from the edge and cannot be used.

For a pixel with center (x0, y0), the intersection of the line y=mx+b with the line y=x/m−x0/m+y0 is the point on y=mx+b closest to the pixel. This occurs at x=m^2·x+m·b+x0−m·y0. Recall that b is arbitrary. However, all these distances depend linearly on b, so changing b simply changes all the distances by the same amount (shifts the line sideways relative to the pixels). Changing the choice of b to b1 changes the vertical distance by m(b−b1) and changes the horizontal distance by m^2·(b−b1)+m(b−b1)+b−b1. Since these distances are independent of x0 and y0, the shift in distance is identical for each pixel if a different choice is made for b. Thus, an arbitrary choice for b may be made.

The slope m is the unknown value estimated by the present invention. For now, assume that m is known and that this knowledge is used to construct the edge response for the knife-edge in the image. For each pixel in the image, a data pair (d, E) is formed by the present invention. The d is the distance from the center of the pixel to the line y=mx+b and E is an integer value of the pixel. For example, a data point (d, 1000) is a pixel (i, j) having a value of 1000 at a perpendicular distance of d from the line y=mx+b. The edge response is a scatter plot of all of these data pairs of (d, E).

The number of such data pairs is the number of pixels in the image, for example N. The present invention uses an index i=1, 2, ... N and orders the data pairs $(d_i, E_i)$ with d going from smallest value to largest value. If a value of d is repeated, then the points with the same value for d are combined into a single point (d, E) where E is the average value of the E values for these pairs that have identical values for d.

Figure 5A:
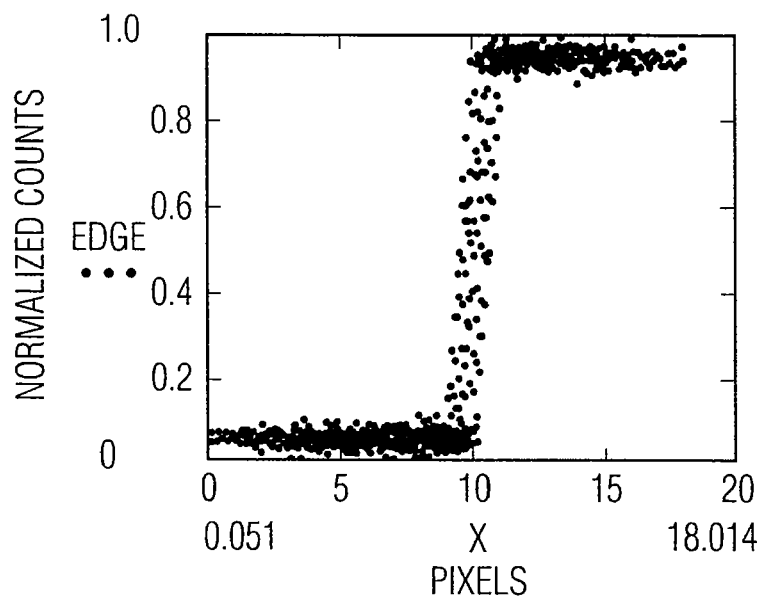
FIGS. 5a and 5b are plots of different edge response data sets, where the spread of the edge response data set of FIG. 5a is wider than the spread of the edge response data set of FIG. 5b.
Figure 5B:
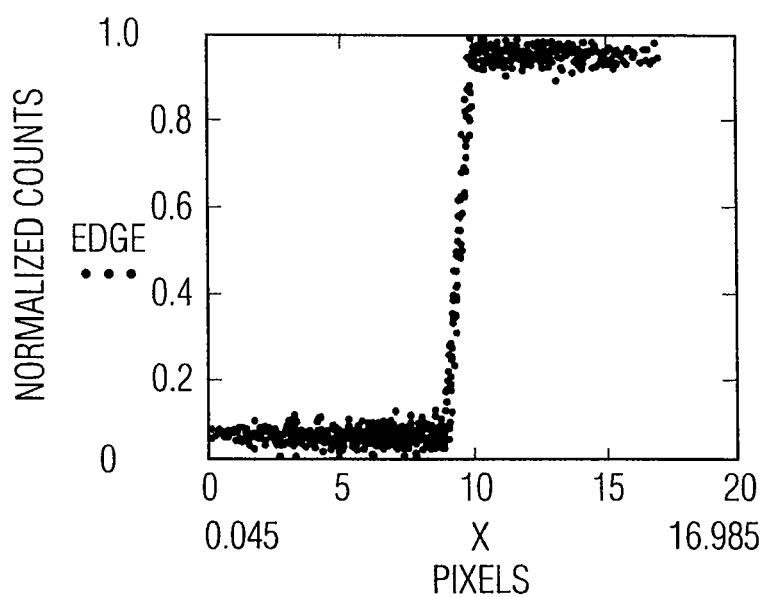

The data pairs $(d_i, E_i)$ are called the edge response. FIGS. 5a and 5b show two edge response data sets. These data sets were both obtained from the same image using different values for the slope m. The edge response of FIG. 5a is a less accurate estimate than the edge response of FIG. 5b. This may be seen by the fact that the edge response shown in FIG. 5a is spread sideways more than the edge response shown in FIG. 5b. The inventors discovered that the best estimate for the slope m is the one that results in the smallest amount of this undesirable spread. It will be understood that some amount of spread is always present, due to noise and other factors. Accordingly, the present invention does not attempt to remove the spread completely, but attempts to minimize the spread.

There are various choices for defining how to minimize the spread. The present invention may effectively use any minimization technique. As one example of minimization of the spread, a least squares regression through a portion of the edge response may be used by the present invention. The least squares regression will now be described. First, a guess for the slope m is made. Any method of getting a first guess may be applied, including visual inspection by an experienced person. One may choose $m_{est}$ to be this first guess slope.

Second, the present invention constructs a sequence of slopes, as follows: Let j=1, 2, ..., NM for some integer value of NM (NM=100 is reasonable), where NM is defined as the number of slopes m.

Third, set $m_j = m_{est} - K\deg + j\deg$ for some choice of K (K=10 for example). The choice of K is arbitrary. If there is gross uncertainty in the choice of $m_{est}$, then K may be selected to be a very large integer, so that a large range of possible slopes is covered by the sequence $\{m_j\}$. The edge response $\{(d_i, E_i)\}$ is constructed using each of the different slopes in the sequence $\{m_j\}$. This gives NM different edge responses. Each edge response has the same values for the $E_i$ because the same pixels are used to construct the edge. The distances $d_i$ change, however, when the slope is changed. Therefore, different slopes form different edge response data sets.

It will be appreciated that conventional methods are fundamentally different from the approach of the present invention in that they calculate a midpoint for every column (row) first, and then use these to position the edge. This means that they use column (row) data first, and then connect the columns (rows). The method of the present invention, on the other hand, uses all the image data at once, thus capturing the autocorrelation of the columns (rows) up front.

Fourth, the edge response shown in FIGS. 5a and 5b are scaled to include values between 0 and 1. The scaling is accomplished by subtracting the minimum pixel value from all the pixels, and then dividing the result by the maximum pixel value less the minimum pixel value. When the edge response is plotted it has a characteristic S-shape and the values range from 0 to 1, as shown.

Fifth, a mid range of values are selected, for example, at a reasonable range of 0.3 to 0.7. When this range is plotted, the response is easier to fit with a simple least squares regression curve, than would be fitting the whole S-shaped curve. The selected mid range of each of the NM edge responses is fitted with the least squares regression curve.

Next, the error sum of squares for each one of these curve fits is computed. The curve fit with the smallest error sum of squares is selected as the best fit, and the slope $m_j$ associated with this curve fit is singled out as the best slope. This slope $m_j$ is now selected as the best guess and the process is repeated. Generally, the process needs only to be repeated once to obtain the accuracy needed, because the precision may be controlled by the choice of NM and the choice of K.

Figure 6:
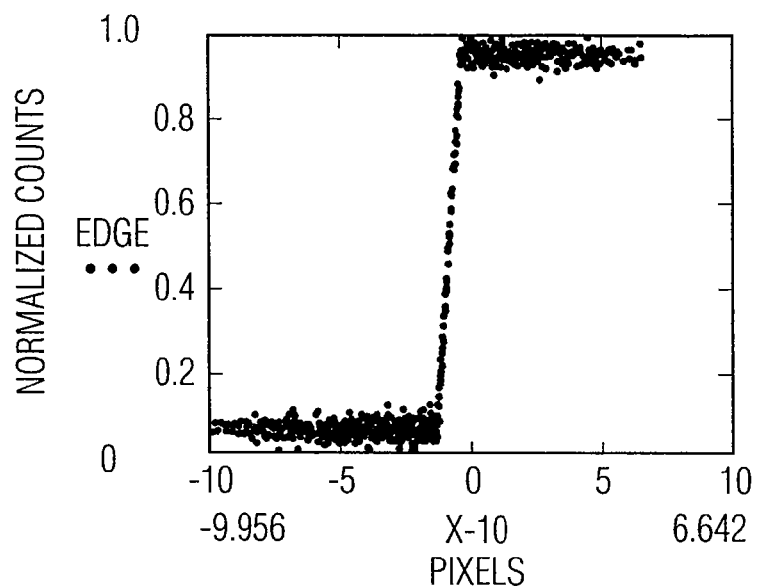
FIG. 6 is a plot of an edge response data set with a fixed constant added to the entire edge response data set, so that the value of E closest to 0.5 is disposed above d=0, in accordance with an embodiment of the present invention.

When the final slope estimate is available, the edge response data set $(d_i, E_i)$ associated with the final slope is then shifted, so that the scaled responses E are positioned with E=0.5 above d=0. This is accomplished by adding a fixed constant to the entire set of distances $d_i$ so that the value of $E_i$ that is closest to 0.5 lies above d=0. This shift is shown in FIG. 6. This is the first estimate performed by the invention in finding the correct shift to realign the edge phase. This, in effect, addresses the fact that an arbitrary value for b in the equation y=mx+b was chosen earlier. As will be explained, by repeated application of another method of the present invention, a better shift of the edge is obtained to recapture the spatial phase of the edge as it was imaged.

Thus far, there was described an edge slope determination method for analyzing an array of numbers that represents an image containing part of one edge and deriving an estimate of the slope of that edge. Since error in edge slope estimation is a big contributor of the overall error in OTF estimation, the present invention improves OTF estimation results. The edge slope method performed by the present invention is also more repeatable than conventional methods and requires less human subjective intervention in data preparation.

Next, a method for estimating the MTF using edge response data is described. The results are more repeatable and more accurate than conventional methods. The results are also easier to apply than conventional methods and do not require subjective data selection or data tweaking.

It will be understood that it is not possible to proceed if the slope is a small integer or a reduced fraction that has a small integer denominator. This is due to the fact that there cannot be enough distinct values $d_i$ in these cases, which is a known issue with knife-edge techniques. The following method assumes that the knife-edge image does not have this undesirable characteristic.

Figure 7:
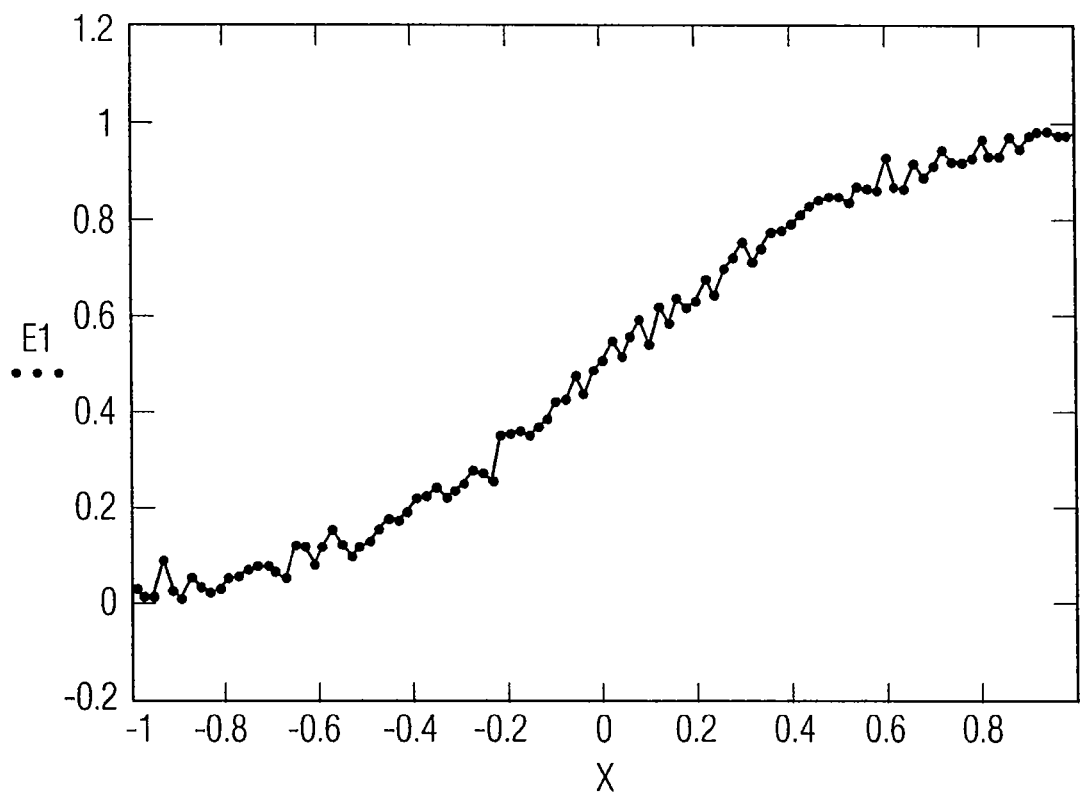
FIG. 7 is an un-scaled edge response data set that has been fitted to a curve, fit(x), by connecting adjacent data points with straight line segments, in accordance with an embodiment of the present invention.

The following method starts with an edge response data set, which is the result of the edge slope determination method, described earlier, and includes shifting the scaled responses E so that they are positioned with E=0.5 being above d=0 (as closely as possible with the raw data set). The edge response is then unscaled, by returning the values E to their original values before scaling. Then a curve, fit(x), is fitted to the data by connecting adjacent data points with straight line segments. The curve, fit(x), is shown in FIG. 7. There are 200 data points, or pairs (d, E), connected by straight lines.

Next, a larger data set is formed by resampling from these straight line segments (for example as shown in FIG. 7) at some smaller spatial interval. The present invention uses first a 1000 samples (for example), and then resamples using 10^5 samples (for example). If there is no difference between the two resamples, then the method is stopped. If there is a significant difference in the result, 10^6 samples are tried and compared to the result obtained by using 10^5 samples. If these are still significantly different, something is assumed to be wrong and the suitability of the data needs to be reviewed by a user.

When the number of samples, NS, is selected (for example 10^5 samples) then the interval size between the samples becomes $$\delta = (d_{max} - d_{min})/NS.$$

An index k=1, 2, . . . , NS is used for $$x_k = d\min + k\delta \text{ and}$$

$$E_k = \text{fit}(x_k)$$

is computed for each k.

An un-scaled modulation transfer function (MTF) for spatial frequency η cycles per pixel (recall that the distances d were in pixels rather than millimeters) is given by the following formula:

$$MTF(\eta) := \left| \frac{\left[ (E_{NS})e^{-2\pi \cdot i \cdot \eta \cdot d_{max}} + 2 \cdot \pi \cdot i \cdot \eta \cdot \delta \cdot \sum_{k=0}^{NS} (E_k \cdot e^{-2\pi \cdot i \cdot \eta \cdot x_k}) \right]}{E_{NS}} \right|$$

The MTF formula is easy to apply and there is no ambiguity in its application, because the raw data points are connected by straight line segments and the spatial location of the edge is clearly specified. The formula does not depend on equal numbers of data points lying to the left and right of a pivot point, such as in Tatian's method. The MTF formula is also valid in situations where the spacings between points in the supersampled edge are not equal, i.e. even if the value of δ depends on the index k and is variable.

The OTF may be obtained using the same formula excluding the absolute value (modulus), if the edge is correctly aligned along the spatial axis. Recall that during the edge slope determination method, the present invention only approximately centered the edge by shifting the edge so that the height E=0.5 of the scaled edge response was directly above d=0 (see FIG. 6). This is correct if the underlying point spread function is an even function about d=0 and there is no noise in the response data. In such case, the imaginary part of the OTF is zero, and the MTF is given by the absolute value of the real part of the OTF. However, this is rarely true in practice and shifting the edge response along the spatial axis is required, if the user wishes to recover the phase.

The present invention defines a function Im(x) which is used to determine the correct phase of the edge response (d,E). The function Im(x) is related to the MTF and OTF. The function represents the imaginary component of the MTF formula above, without the absolute value. The function Im(x) is a follows:

$$\underset{\sim\sim\sim}{\text{Im}}(\eta) := \text{Im} \left[ \frac{\left[ (E_{NS})e^{-2\pi \cdot i \cdot \eta \cdot d_{max}} + 2 \cdot \pi \cdot i \cdot \eta \cdot \delta \cdot \sum_{k=0}^{NS} (E_k \cdot e^{-2\pi \cdot i \cdot \eta \cdot x_k}) \right]}{E_{NS}} \right]$$

The spatial alignment of the edge is optimized by minimizing two separate aspects of the function Im(x) simultaneously. Note that the value of Im(x) changes if the set of spatial values $\{x_i\}$ is shifted to the left or right (when a fixed constant is added to all of the $x_i$). This constant offset is the variable that is varied in this minimization process. The aspects to be minimized are (1) the absolute value of Im(cf), where cf is the cutoff spatial frequency (sampling frequency) given in cycles per pixel, and (2) the integral of the norm of Im(x) between 0 and cf.

The constant shift of the spatial set $\{x_i\}$ is selected as the correct offset for phase preservation. In order to minimize both values at the same time, a weighting choice may be made.

Figure 8:
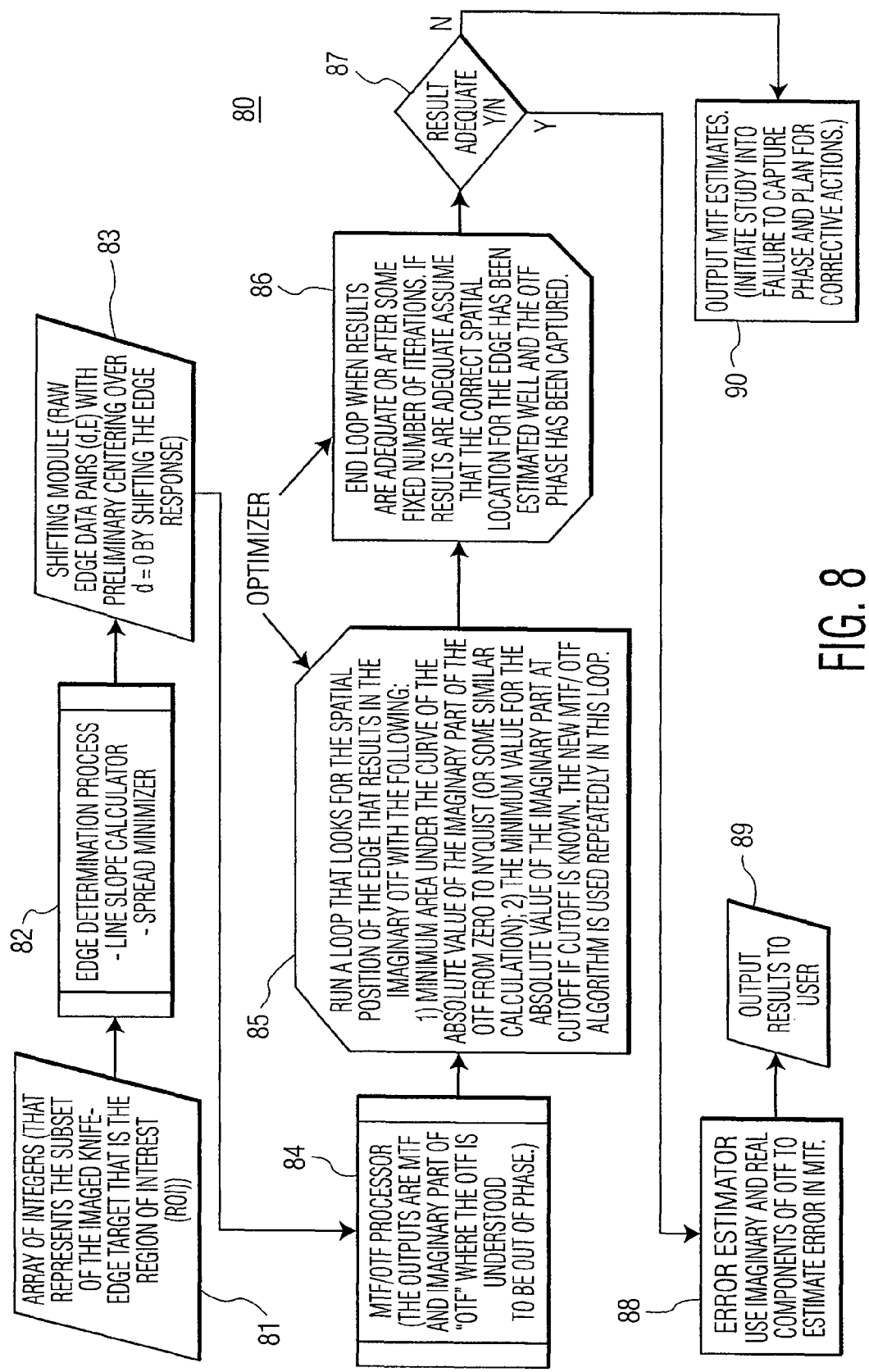
FIG. 8 is a system for obtaining an optimal OTF from an edge in a sampled image data set, in accordance with an embodiment of the present invention.

Referring next to FIG. 8, there is shown system 80 for obtaining an optimal OTF from an edge in a sampled image data set. The knife-edge data sets, stored in a computer memory (FIG. 3a), for example, are configured into two column vectors X and E. The X column contains the spatial distance from some fixed reference point on the x axis and the E column contains scaled response counts that may be plotted on the y axis. The X values are assumed to be in pixels rather than in mm, so that pixel size is not a variable. In this example, the edge data stored in the computer memory was constructed from a physical setup in which the target edge is "dark to the left" and "light to the right". This means that the edge response transitions from low to high with increasing x.

The array of integers 81 in FIG. 8, representing column vectors X and E include the edge response data, where the rows of X correspond to the rows of E, and X is sorted from the smallest value to the largest value. The edge determination processor 82 executes the edge slope determination algorithm, described earlier. After the final slope estimate is available, the edge response data set ($d_i$, $E_i$) associated with the final slope is then shifted by shifting module 83, so that the scaled responses E are positioned with E=0.5 above d=0. This is accomplished by adding a fixed constant to the entire set of distances $d_i$ so that the value of $E_i$ that is closet to 0.5 lies above d=0.

System 80 includes an MTF/OTF processor (or algorithm), generally designated as 84. The outputs of the MTF/OTF algorithm are the MTF and the imaginary part of the OTF, where the OTF is understood to be out of phase, as described earlier. Next, optimizer 85, 86 executes a loop that looks for the spatial position of the edge that results in the imaginary OTF component with one of the following two:

(1) the minimum area under the curve of the absolute value of the imaginary part of the OTF from zero to the optical cutoff frequency; and (2) the minimum value for the absolute value of the imaginary part at the cutoff frequency, if the cutoff frequency is known.

The loop is ended, when results are adequate or after some predetermined fixed number of iterations. If the results are adequate, the system assumes that the correct spatial location for the edge has been estimated and the OTF phase has been captured.

Figure 9:
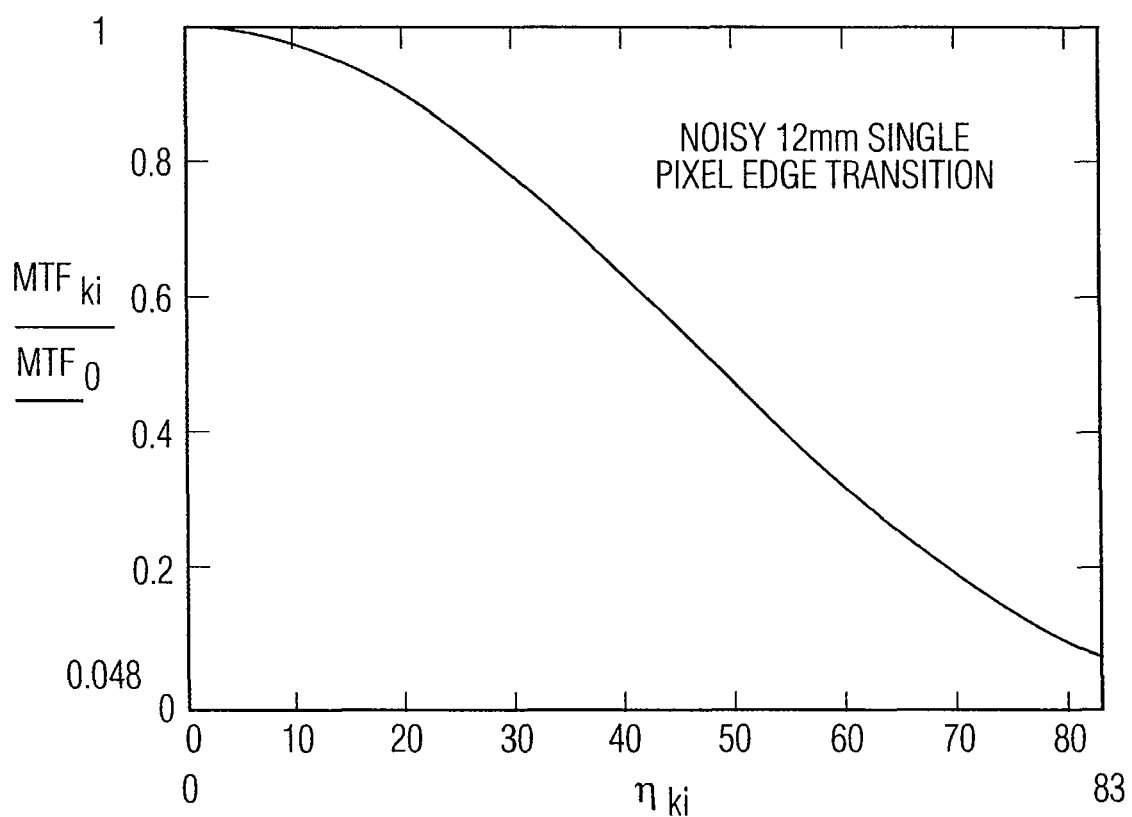
FIG. 9 is an exemplary plot of MTF as a function of spatial frequency.

If the results of the loop are not adequate (as determined by decision box 87) the MTF estimates are provided to the user on a display or paper output 90. The user should now determine corrective actions. If, on the other hand, the results are adequate, an error estimator, designated as 88, provides an estimate of error in the MTF. The MTF estimates are provided to the user on a display or paper output 89. An exemplary MTF plot is shown in FIG. 9.

The above MTF/OTF formula will now be derived in a more rigorous manner. As explained, the knife-edge data sets are configured into two column vectors X and E. The X column contains the spatial distance from some fixed reference point on the x axis and the E column contains scaled response counts that may be plotted on the y axis. The X values are assumed to be in pixels rather than in mm, so that pixel size is not a variable. The NR is the length of these column vectors (note that Mathcad indexing begins at 0). The NS+1 is the number of steps in the sum and, in general, NS is set to $10^5$ (as an example). We define the following:

$$LL = \min(X) \quad UL = \max(X) \quad NS = 1000 \quad i = 0 \ldots NS$$

$$xx_i = LL + \frac{i}{NS} \cdot (UL - LL) \quad \delta = \frac{UL - LL}{NS}$$

The function fit(x) is the collection of straight line segments connecting the points $(X_{(i-1)}, E_{(i-1)})$ and $(X_i, E_i)$ for i= 1, ..., NS. Then we have $(X_i, E_i)$ for i=1, ..., NS.

$FE_i$=fit($xx_i$) and where FE is a resampling of the data.

With these defined parameters, the following OTF formula will now be considered:

$$OTF(\eta) = e^{-2\cdot\pi\cdot i\cdot\eta\cdot UL} + 2\cdot\pi\cdot i\cdot\eta\cdot\delta\cdot\sum_{j=0}^{NS}(FE_i\cdot e^{-2\cdot\pi\cdot i\cdot\eta\cdot xx_i})$$

where $\eta$ is in cycles/pixel and xx is in pixels

The above formula may be derived by starting with a normalized point spread function $\tau(x)$ and the definition of the OTF:

$$\tau(x) \geq 0 \quad \int_{-\infty}^{\infty} \tau(x)dx = 1 \quad OTF(\eta) = \int_{-\infty}^{\infty} \tau(x)\cdot e^{-2\cdot\pi\cdot i\cdot\eta\cdot x}dx$$

Both integrals are absolutely convergent. The introduction of an error is limited so as not to exceed $\epsilon$ into the calculation of the OTF, for example $\epsilon=0.0001$. It is possible to select numbers LL and UL, so that for all $\eta$ in the interval [0,N] (for arbitrary N) the following two inequalities hold:

$$\left|\int_{LL}^{UL}\tau(x)\cdot e^{-2\cdot\pi\cdot i\cdot\eta\cdot x}dx - OTF(\eta)\right| < \frac{\epsilon}{3}$$

$$\int_{-\infty}^{LL}\tau(x)dx < \frac{\epsilon}{3}$$

This selection is different from Tatian's derivation. Here a small error in the OTF is allowed (0.0001 magnitude in this example). By being willing to accept this small error, the present invention is able to work with finite limits on the integral, rather than working with plus and minus infinity. This enables the direct application of integration by parts and eliminates the need to fall back on the (C,1) convergence (Cesaro convergence of infinite sums and integrals) used by Tatian. The finite integral is as follows:

$$\int_{LL}^{UL}\tau(x)\cdot e^{-2\cdot\pi\cdot i\cdot\eta\cdot x}dx$$

-continued $$u = e^{-2\cdot\pi\cdot i\cdot\eta\cdot x} \quad du = 2\cdot\pi\cdot i\cdot\eta\cdot e^{-2\cdot\pi\cdot i\cdot\eta\cdot x} \quad dv = \tau(x)dx \quad v = E(x)$$

This finite integral may be used to replace the OTF and yield a result within 0.0001 of the true theoretical result. In practice, choosing LL to be −50 pixels and UL to be +50 pixels is adequate. The edge response is zero for x<LL and 1 for x>UL.

We use integration by parts to rearrange this integral, using E(LL)=0, and E(UL)=1, as follows:

$$\int_{LL}^{UL}\tau(x)\cdot e^{-2\cdot\pi\cdot i\cdot\eta\cdot x}dx = e^{-2\cdot\pi\cdot i\cdot\eta\cdot UL}\cdot E(UL) - e^{-2\cdot\pi\cdot i\cdot\eta\cdot LL}\cdot E(LL)\ldots +$$

$$\int_{LL}^{UL}E(x)\cdot\left(2\cdot\pi\cdot i\cdot\eta\cdot e^{-2\cdot\pi\cdot i\cdot\eta\cdot x}dx\int_{LL}^{UL}\tau(x)\cdot e^{-2\cdot\pi\cdot i\cdot\eta\cdot x}dx\right) =$$

$$e^{-2\cdot\pi\cdot i\cdot\eta\cdot UL} + \int_{LL}^{UL}E(x)\cdot(2\cdot\pi\cdot i\cdot\eta\cdot e^{-2\cdot\pi\cdot i\cdot\eta\cdot x})dx$$

It follows that for any $\eta$ in [0,N] (where N may be selected to be arbitrarily large) there is a (complex) number $\xi$ with $|\xi|<(2/3)\epsilon$, so that $$e^{-2\cdot\pi\cdot i\cdot\eta\cdot UL} + \int_{LL}^{UL}E(x)\cdot(2\cdot\pi\cdot i\cdot\eta\cdot e^{-2\cdot\pi\cdot i\cdot\eta\cdot x})dx = OTF(\eta) + \xi$$

With sufficiently large NS and i=0, ..., NS and with xx and $\delta$ as defined below, the inequality below holds. This is possible for practical values of E if $\tau(x)$ is absolutely integrable and piecewise continuous on the interval [LL,UL].

$$xx_i = LL + \frac{i}{NS}\cdot(UL - LL) \quad \delta = \frac{UL - LL}{NS}$$

$$\left|\int_{LL}^{UL}E(x)(2\cdot\pi\cdot i\cdot\eta\cdot e^{-2\cdot\pi\cdot i\cdot\eta\cdot x})dx - \sum_{j=0}^{NS}\left[(2\cdot\pi\cdot i\cdot\eta\cdot\delta)\cdot E(xx_i)\cdot e^{-2\cdot\pi\cdot i\cdot\eta\cdot xx_i}\right]\right| < \frac{\epsilon}{3}$$

It follows that the difference between the formula provided above and the OTF has a magnitude bounded by $\epsilon$.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for obtaining a modulation transfer function (MTF) of an electro-optical device using an image of a knife-edge target, the method comprising the steps of:

(a) obtaining edge response data points, wherein a data point includes a perpendicular distance, d, to the knife-edge target;

(b) constructing a sequence of line slopes of the edge response data points, wherein a line slope includes a spread of edge response data points;

(c) selecting a line slope that minimizes the spread of edge response data points;

(d) calculating the MTF, based on the edge response data points included in the line slope selected in step (c); and (e) providing the MTF to a user;

wherein step (c) includes using least squares regression to minimize the spread of the edge response data points.

2. The method of claim 1 wherein step (a) includes obtaining the edge response data points, wherein the data point includes an integer intensity value, E, of a pixel corresponding to the data point.

3. The method of claim 2 wherein the data point is defined by a pair of values of (d, E) of the pixel, and the distance d is a shortest distance between the pixel and the line slope.

4. The method of claim 1 further comprising the step of:

prior to calculating the MTF, shifting the selected line slope by adding a constant value to each distance d in the pair of values, so that the edge response data points are approximately centered about d=0.

5. The method of claim 4 further comprising the steps of:

selecting an imaginary portion of the MTF defined as Im(x), where x is a spatial value between 0 and a cutoff spatial frequency, cf; and minimizing the imaginary portion of the MTF includes minimizing an absolute value of Im(cf), as the value of x is shifted when adding the constant value to the value of x.

6. The method of claim 4 further comprising the steps of:

selecting an imaginary portion of the MTF defined as Im(x), where x is a spatial value between 0 and a cutoff spatial frequency, cf; and minimizing the imaginary portion of the MTF includes minimizing a norm of Im(x) between 0 and cf.

7. The method of claim 4 further comprising the step of:

providing to the user an optical transfer function (OTF) of the electro-optical device producing the image of the knife-edge target, if the spread of the edge response data points is an even function about d=0.

8. The method of claim 4 wherein after shifting the line slope, fitting a curve, fit (x), to the edge response data points by connecting adjacent data points with straight line segments, and resampling, at smaller spatial intervals, data points of the curve of fit (x) and computing $Ek = \text{fit}(xk)$ where k is an index of k=1, 2, ..., NS, and
NS is the number of samples, and
calculating the MTF as follows:

$$MTF(\eta) := \left| \frac{\left[ (E_{NS})e^{-2\pi \cdot i \cdot \eta \cdot d_{max}} + 2 \cdot \pi \cdot i \cdot \eta \cdot \delta \cdot \sum_{k=0}^{NS}(E_k \cdot e^{-2\pi \cdot i \cdot \eta \cdot x_k}) \right]}{E_{NS}} \right|.$$

9. The method of claim 8 including the step of:

computing an imaginary component of an OTF as follows:

$$\text{Im}(\eta) := \text{Im}\left[ \frac{\left[ (E_{NS})e^{-2\pi \cdot i \cdot \eta \cdot d_{max}} + 2 \cdot \pi \cdot i \cdot \eta \cdot \delta \cdot \sum_{k=0}^{NS}(E_k \cdot e^{-2\pi \cdot i \cdot \eta \cdot x_k}) \right]}{E_{NS}} \right]$$

where Im is the imaginary component of the OTF.

10. A system for providing to a user an MTF of an electro-optical device comprising an edge determination module for receiving edge response data of a knife-edge target, imaged by the electro-optical device, and calculating a sequence of line slopes of the knife-edge target, each line slope including a spread of edge response data points about the respective line slope, a selector module for selecting a line slope having a minimum spread of the edge response data points, and an MTF calculator for determining MTF based on the selected line slope, wherein the selector module includes a least squares regression algorithm for minimizing the spread of the edge response data points.

11. The system of claim 10 including a storage device, coupled to the edge determination module, for storing the edge response data.

12. The system of claim 11 wherein the storage device includes an array of integers representing the edge response data as pairs of values of (d, E), where d is a minimum distance between a respective pixel and a respective line slope, and E is an intensity value of the respective pixel.

13. The system of claim 12 including a shifting module, coupled to the selector module, for shifting the selected line slope by adding a constant value to each distance, d, in the pair of values (d, E), so that the edge response data points are approximately centered about d=0.

14. The system of claim 10 wherein the MTF calculator uses the following equation for determining the MTF:

$$MTF(\eta) := \left| \frac{\left[ (E_{NS})e^{-2\pi \cdot i \cdot \eta \cdot d_{max}} + 2 \cdot \pi \cdot i \cdot \eta \cdot \delta \cdot \sum_{k=0}^{NS}(E_k \cdot e^{-2\pi \cdot i \cdot \eta \cdot x_k}) \right]}{E_{NS}} \right|.$$

15. A system for providing to a user an OTF of an electro-optical device comprising an edge determination module for receiving edge response data of a knife-edge target, imaged by the electro-optical device, and calculating a sequence of line slopes of the knife-edge target, each line slope including a spread of edge response data points about the respective line slope, a selector module for selecting a line slope having a minimum spread of the edge response data points, and an OTF calculator for determining OTF based on the selected line slope, wherein the selector module includes a least squares regression algorithm for minimizing the spread of the edge response data points.

16. The system of claim 15 wherein
the edge response data points includes an array of integers having pairs of values of (d, E),
where d is a minimum distance between a respective pixel and a respective line slope, and
E is an intensity value of the respective pixel.

17. The system of claim 16 including
a shifting module, coupled to the selector module, for shifting the selected line slope by adding a constant value to each distance, d, in the pair of values (d, E), so that the edge response data points are approximately centered about d=0.

18. The system of claim 17 wherein
the OTF calculator includes an imaginary function Im(x), where x is a spatial value between 0 and a cutoff spatial frequency, cf, and
the OTF calculator is configured to minimize either (a) the absolute value of Inn (cf) or the integral of the norm of Im(x) between 0 and cf.

* * * * *